United States Patent [19]
Carnahan

[11] 3,742,816
[45] July 3, 1973

[54] CARVING AND ENGRAVING MACHINE

[76] Inventor: Edward L. Carnahan, 645 N. Ardmore Avenue, Apt. 102, Los Angeles, Calif. 90004

[22] Filed: Oct. 2, 1970

[21] Appl. No.: 77,541

[52] U.S. Cl. .................................. 90/13.1, 33/23 C
[51] Int. Cl. .......................... B23c 1/16, B43l 13/10
[58] Field of Search ........................... 90/13.1, 13.2; 33/23 C, 23 R; 144/145, 144 B

[56] References Cited
UNITED STATES PATENTS

| 427,717 | 5/1890 | Travis | 90/13.2 X |
| 321,482 | 7/1885 | Burgess | 33/23 C |
| 2,082,615 | 6/1937 | Brown | 33/23 C |
| 3,460,433 | 8/1969 | Pecchioli | 408/87 X |

FOREIGN PATENTS OR APPLICATIONS

| 1,170,481 | 1959 | France | 33/23 R |

Primary Examiner—Andrew R. Juhasz
Assistant Examiner—Z. R. Bilinsky
Attorney—John R. Shewmaker

[57] ABSTRACT

A carving and engraving machine is disclosed. The machine includes a work table on which a workpiece into which a pattern is to be carved is clamped. The work table is manually movable in a fixed plane in a pattern corresponding to a master pattern which is followed by a manually biasable stylus at a 1:1 ratio. A foot actuated hydraulic system is used to drive a cutting tool into the moving workpiece to an accurate depth, controlled by the setting of a novel motor assembly. The latter facilitates stroke length control and compensation for different material thicknesses carvable with different length cutting tools.

8 Claims, 9 Drawing Figures

INVENTOR.
EDWARD L. CARNAHAN
BY
Lindenberg, Freilich & Wasserman
ATTORNEYS

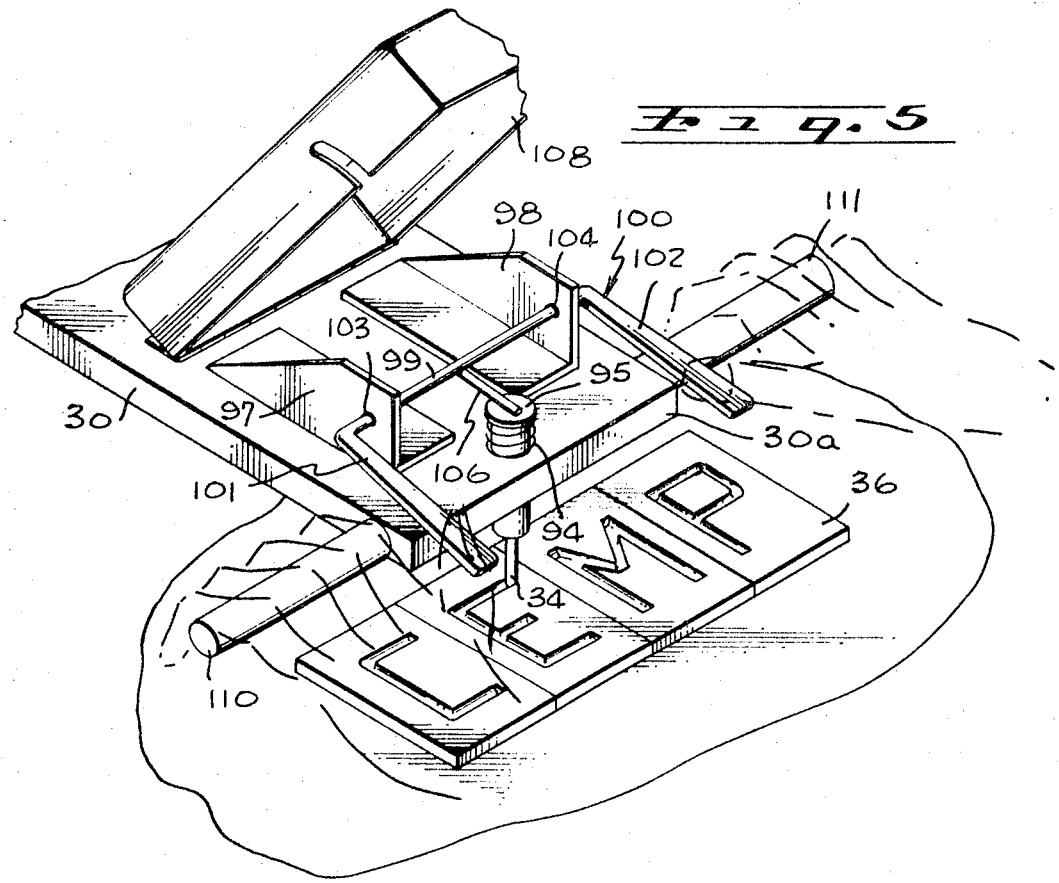
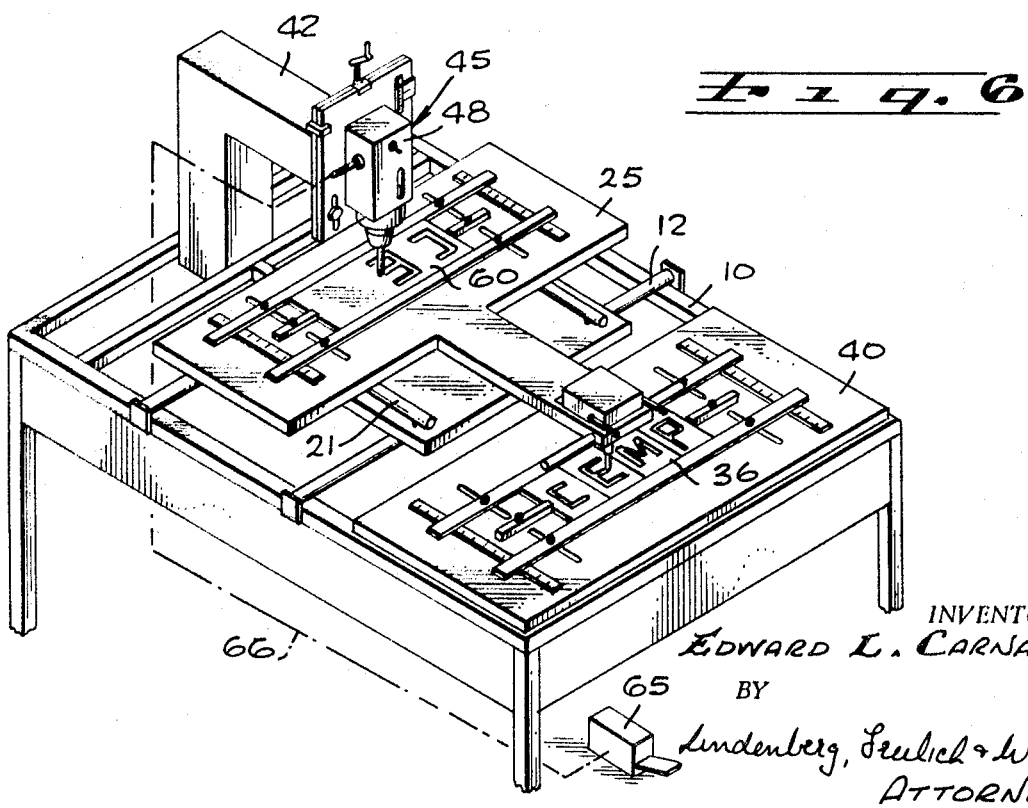

EDWARD L. CARNAHAN
INVENTOR.

BY
Lindenberg, Freilich & Wasserman
ATTORNEYS

CARVING AND ENGRAVING MACHINE

BACKGROUND OF THE INVENTION

1. Field of the Invention:

The present invention generally relates to carving and engraving machinery and, more particularly, to an improved apparatus for carving and engraving lettering and patterns in wood, plastic laminated materials or the like.

2. Description of the Prior Art:

Many carving and engraving machines are presently in use. They are quite complex, thereby limiting their use to highly trained personnel. Also, they are quite expensive, often beyond the reach of the average sign shop, which is engaged in making signs, and cut out letters, typically of wood or plastic. Thus, a need exists for a new carving and engraving machine which is less expensive and complex than prior art machines, yet capable of carving or engraving patterns in wood or the like with a high degree of accuracy and repeatability.

OBJECTS AND SUMMARY OF THE INVENTION

It is a primary object of the present invention to provide a new improved carving and engraving machine.

Another object of the invention is to provide a novel carving and engraving machine which is characterized by high reliability, performance accuracy and ease of operation and which is less expensive and complex than prior art carving and engraving machines.

A further object of the invention is to provide a carving and engraving machine which is compact in size, yet capable of carving or engraving large objects.

These and other objects of the invention are achieved by providing a machine comprising a basic horizontal frame which supports a first pair of horizontally mounted rods. These rods extend in a first direction, hereafter defined as the X axis. Slidably mounted on these rods by means of ball bushings is a first table which is slidable in the X axis. The first table supports a second pair of rods which extend in a second direction, perpendicular to the X axis and hereafter defined as the Y axis. By means of ball bushings a second table, hereafter referred to as the work table, is mounted on the second pair of rods, so that it can slide on these rods in the Y axis.

An arm which extends from the work table, has a manually actuatable stylus extending therefrom. The function of the stylus is to engage a pattern to be carved or engraved. The pattern is supported on a stationary master copy table which is fixedly mounted on the frame. The arm is manually movable so that the stylus follows in the pattern, thereby causing the work table to move in a plane defined by the X and Y axes in a pattern corresponding to the pattern to be carved or engraved at a ratio of 1:1.

Extending from the frame is an arm which in turn supports a motor unit, including a motor above the top table. The position of the motor is adjustable in a vertical axis, hereafter referred to as the Z-axis. A pattern is carved in a work piece, such as wood, on the work table by biasing the motor downwardly so that a cutting tool attached to the motor carves into the workpiece to a desired depth, while the work table is moved in the X-Y plane by manually moving the arm so that the stylus follows the desired pattern to be carved. The motor unit includes a novel arrangement which enables accurate depth of cut selection with ease and reliability.

The novel features of the invention are set forth with particularity in the appended claims. The invention will best be understood from the following description when read in conjunction with the accompanying drawings.

BRIEF DESCRIPTION OF THE DRAWINGS

FIG. 5 is an isometric view of a stylus unit;

FIG. 6 is a partial isometric view of the machine;

DESCRIPTION OF THE PREFERRED EMBODIMENTS

Figure 1:
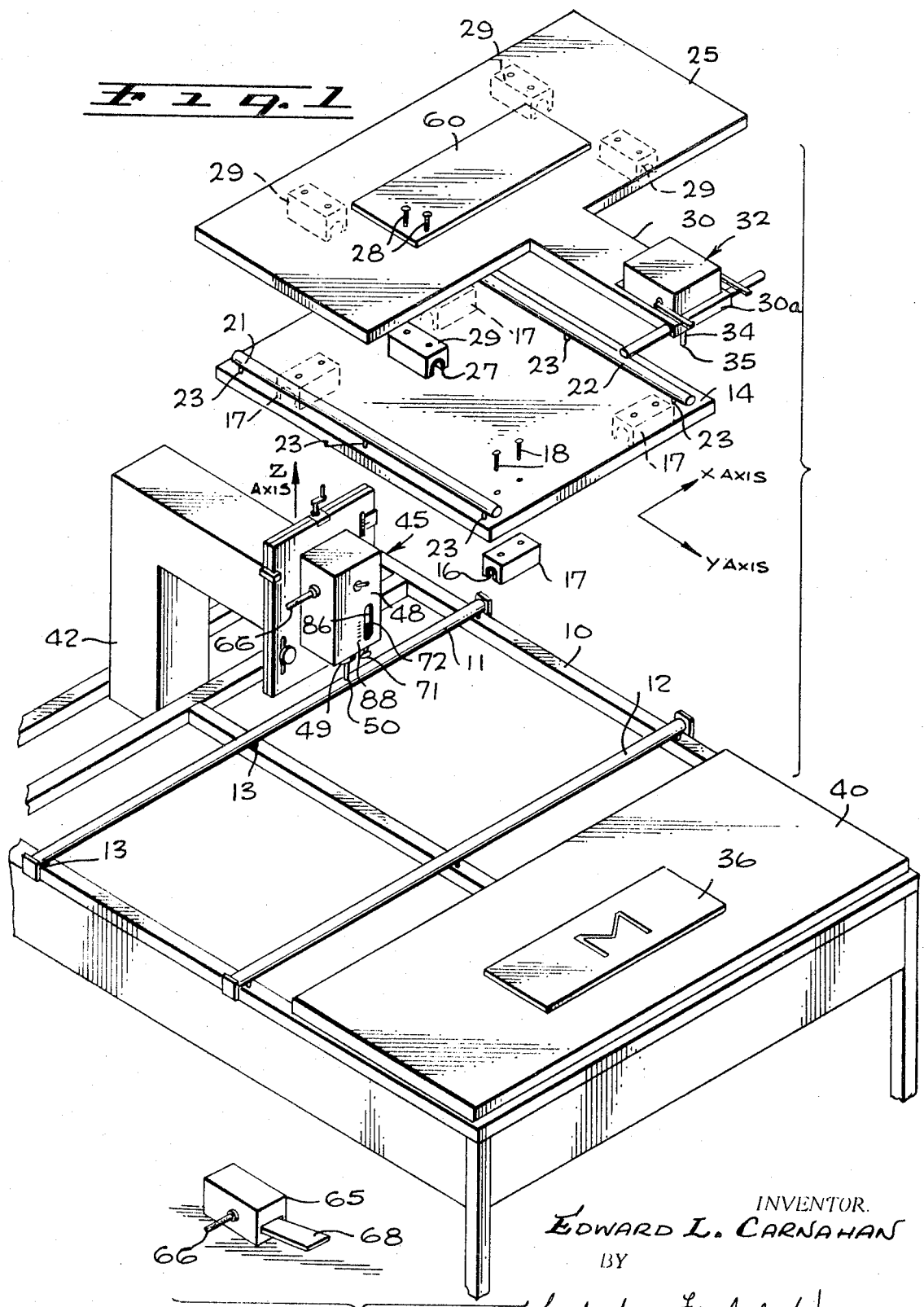
FIG. 1 is an expanded isometric view of the present invention.

Attention is first directed to FIG. 1 wherein numeral 10 designates a main frame, on which a pair of rails 11 and 12 are mounted by means of stand off screws 13. The rails which are parallel to one another have their longitudinal axes aligned in a horizontal plane and in an X axis or direction. The function of these rails is to facilitate the motion of a frame-like member 14 in the X axis. Member 14 which in FIG. 1 is shown as a table rides on rails 11 and 12 by means of four ball bushings 16, housed in housings 17 which are fastened to the bottom side of table 14 by means of screws 18.

The function of table 14 is to support thereon a pair of rails 21 and 22 by means of stand off screws 23. Rails 21 and 22 are also in parallel alignment in a horizontal plane above table 14 with their longitudinal axes aligned in a Y axis or direction, which is perpendicular to the X axis. Riding on rails 21 and 22 for motion in the Y axis is a work table 25. Four ball bushings 27, housed in housings 28, which are fastened to the bottom side of the work table 25, by means of screws 29, ride on rails 21 and 22.

The application of a force in the X axis to work table 25 causes it to move in the X axis by means of table 14 which is free to move in this direction on rails 11 and 12. A force in the Y axis, applied to work table 25, causes it to move in this direction on the rails 21 and 22. Any other force in the XY plane is resolved into its two perpendicular components thereby enabling the work table 25 to be moved in the horizontal XY plane.

As shown in FIG. 1, an arm 30 extends from work table 25. At an arm end 30a remote from table 25, the arm supports a stylus assembly 32, which will be explained hereafter in detail. Briefly, the assembly 32 includes a stylus 34 which extends downwardly through arm 30. The stylus has an exposed tip 35. Its function is to engage and follow a pattern, such as the letter "M" in a master 36. The latter is assumed to be clamped or otherwise secured on a flat master copy table 40, which is fixedly mounted in a horizontal plane by and above the main frame 10.

As will be explained hereafter in further detail, the stylus 34 is manually biasable to cause its tip 35 to engage the master pattern. Once engaged, it is caused to follow the pattern by the application of a manual force to the arm 30. Thus, as the stylus tip follows the master pattern, the work table 25 moves in a corresponding pattern in a horizontal plane at a 1:1 ratio.

As shown in FIG. 1, extending from frame 10 at an end remote from the master copy table 40 is an arm 42 which supports a novel motor assembly 45 at a height above the top of the work table 25. Assembly 45 includes a motor 46 (see FIG. 2) which is enclosed by a cover 48 (see FIG. 1). Extending from the bottom of cover 48 is a motor chuck or collet 49 into which a cutting tool 50 is insertable. The tip of the cutting tool 50 points toward work table 25. Briefly, the motor is mounted so that its axis of rotation and that of the cutting tool 50 are in a vertical or Z axis, perpendicular to the XY plane.

Figure 2:
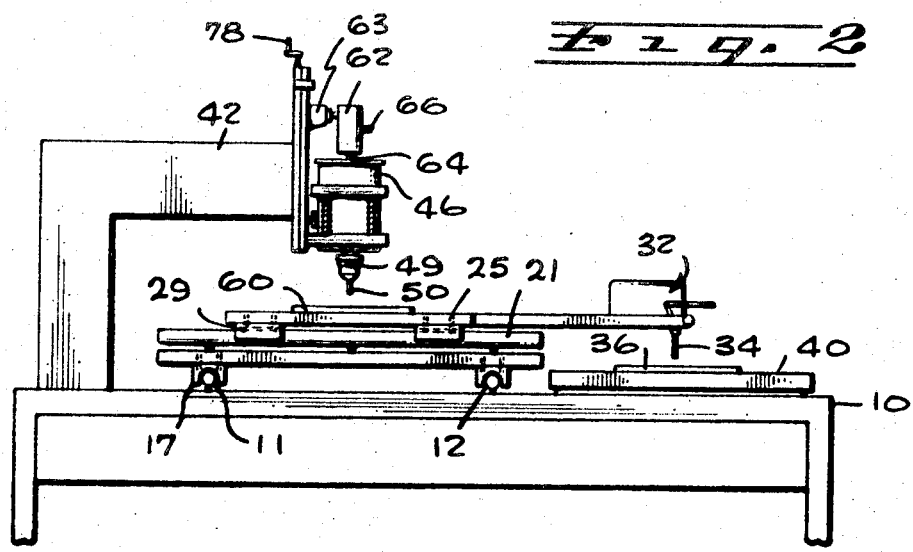
FIG. 2 is a side view of the machine of the present invention.

As shown in FIG. 2, the assembly 45 further includes a pair of elevation plates 51 and 52 and a pair of motor mounting plates, hereafter referred to as motor plates 53 and 54. These four plates are shown in isometric view in FIG. 3. The elevation plate 51 is fixedly connected to arm 42 for disposition in a vertical plane. While the position of plate 51 is fixed, plate 52 is associated therewith in such a way that prevents its motion in all directions except in the vertical or Z axis. This is achieved by a pair of side guides 56 and 57 which are fastened to plate 51, and a gib 58 and way 59 (see FIG. 4) in plates 52 and 51, respectively. These prevent plate 52 from becoming separated from plate 51 in the X and Y axes and insures motion of plate 52 in the Z axis only.

Plate 54 defines four openings 61 through which screws 55 extend to plate 53 wherein their ends are threaded. Coil springs 56 bias plate 54 away from plate 53 against the heads 55a of screws 55. The two plates 53 and 54 have corresponding openings or holes 53a and 54a, respectively, whose centers are aligned in the Z axis. The dimensions of the holes are chosen to insure slip fit with the exterior surface of the motor 46 whose head is clamped to plate 54, such as by a set screw 54x.

The plate 53 is fastened to movable plate 52 and is disposed in a horizontal plane, while plate 54 is spaced from plate 52. Thus, while plate 53 is in a horizontal or the XY plane, the motor's axis of rotation and that of cutting tool 50 are in the Z axis. The actual height of the tip of cutting tool 50 above a work piece, such as wood, 60 on work table 25 is controlled by the relative vertical position of the plate 52 with respect to plate 51 and the fully spring biased position of plate 54 with respect to plate 53. The cutting tool is lowered from this height into the workpiece by the application of a downward force to the motor top which presses both the motor and plate 54 toward plate 53 against the upward bias forces provided by springs, 56. Although the workpiece is often referred to as wood, it should be appreciated that the invention is not limited thereto. Any carvable or engravable material, such as plastic, laminated material, or metals are included.

Figure 3:
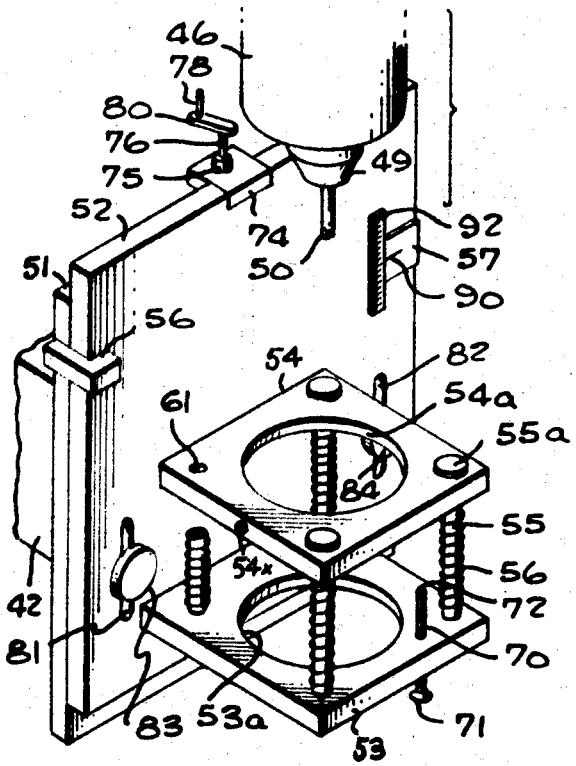
FIGS. 3 and 4 are isometric views of a novel motor assembly unit.
Figure 4:
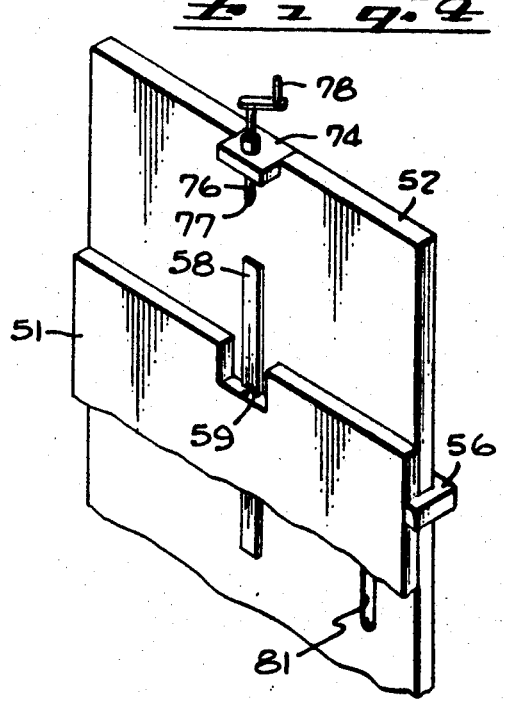

In accordance with the present invention such a force is provided by a hydraulic unit, comprising a hydraulic cylinder 62 which is fixedly connected to plate 52 by a bracket 63 (FIG. 2). The piston rod 64 of cylinder 62 engages the top of motor 46. The cylinder is activated by hydraulic fluid directed thereto from a pedal-activated fluid reservoir 65 (FIG. 1) via a hydraulic line 66. By depressing pedal 68 the piston rod 64 applies a downward force to motor 46, sufficient to overcome the upward force applied to plate 54 by springs 56. Thus, the motor and more importantly the cutting tool 50 are lowered by the activation of foot pedal 68. To control the stroke length, which represents the maximum distance which the cutting tool can be lowered in response to depressing foot pedal 68, a control stop mechanism is associated with plates 53 and 54. In the embodiment described, it is represented by a screw 70 (FIG. 3), threaded through plate 53 with its head 71 exposed on the bottom side of cover 48 (FIG. 1) and its tip 72 toward plate 54 (FIG. 3). The distance between the tip 72 and plate 54 defines the stroke length. By threading the screw 70 into or out of plate 53, this distance is controllable. In practice, the stroke length is always greater than the depth of cut, by the desired distance between the top surface of the workpiece 60 and the cutting tool tip between cuts. Generally the latter distance is less than one-half inch, e.g., one-fourth inch.

As previously stated, while the elevation plate 51 is fixedly connected to the frame 10, via arm 42 (see FIG. 3), the other elevation plate 52 is controllably movable in the vertical Z axis. The relative position of plate 52 in the Z axis with respect to plate 51 is controlled by an arrangement best described in conjunction with FIGS. 3 and 4. Basically, fixedly connected to the top of plate 52 is member 74 which defines a nut-like threaded opening 75. Threaded therein is a screw 76 whose tip 77 engages the top of plate 51. A handle or crank 78 is connected to the screw top 80. The member 74 acts as a traveling nut, which causes the plate 52 to move upwardly when the screw 76 is rotated toward plate 51. When rotated in the opposite direction away from plate 51, gravity forces pull the plate 52 downwardly so that at all times tip 77 is in contact with plate 51. As seen from FIGS. 3 and 4, the plate 52 defines a pair of slots 81 and 82 through which knobs 83 and 84 extend to and are threaded in plate 51. These knobs are tightened to clamp plate 52 to plate 51 except when the elevation of plate 52 is varied.

The manner in which the aforedescribed machine is operated to accurately select depth of cut will now be described in conjunction with a specific example. In the example it is assumed that the desired depth of cut is one-quarter inch and the chosen stroke length is one-half inch, so that between cuts the cutting tool tip is one-quarter inch above the top surface of the workpiece 60. In operation the stroke length of one-half inch is first set. This is achieved by viewing the tip 72 (FIG. 3) of screw 70 through an opening 86 (FIG. 1) in cover 48 and by rotating the screw head 71 until its tip is aligned with an appropriate marking for ½ inch stroke of a scale 88 on the cover 48. Thereafter, the pedal 68 is depressed until the top motor plate 54 engages tip 72 of screw 70, representing the bottom of the stroke. While so engaged and while knobs 88 and 84 are loosened, crank 78 (FIG. 4) is rotated to lower plate 52 and the rest of the parts connected thereto toward the workpiece 60. This is done until the cutting tool tip touches the workpiece. Thereafter, the pedal 68 is released and therefore the motor returns to its upward position at the top of the stroke, due to the upward forces applied by springs 56.

After releasing the pedal 68, the crank 78 is further rotated to lower plate 52 by an amount exactly equal to the desired depth of cut, which in the present example is one-quarter inch. The exact lowering of plate 52 is facilitated by a pointer 90 (FIG. 3) on bracket 57 which is fixed to plate 51, with respect to a scale 92 (FIG. 3) which is fixed to plate 52. Once these steps are executed, knobs 83 and 84 are tightened to prevent relative motion of plate 52 with respect to plate 51. Thus, the motor can only move downwardly by depressing foot pedal 68, or upwardly after the pedal is released.

From the foregoing description it should thus be appreciated that the motor assembly 45 includes a novel arrangement for controlling depth of cut, as well as stroke length. The motor is mounted on and between a pair of motor plates which are biased away from one another by springs. One of the motor plates is fixedly connected to a first elevation plate so that the motor's axis of rotation is in a vertical Z axis. The motor is movable in the Z axis toward a workpiece by a foot-activated hydraulic system which applies a downward force, sufficient to overcome the upward forces provided by the springs. The maximum downward distance which the motor can travel is controlled by stroke length control means represented by screw 70. The first elevation plate is controllably movable in the Z axis with respect to a fixed second elevation plate. By first setting stroke length which is always greater than the depth of cut, the latter is precisely defined by the accurate positioning of the first elevation plate in the Z axis with respect to the fixed second elevation plate.

Attention is now directed to FIG. 5 wherein the stylus assembly 32 is shown in isometric view. It includes the stylus 34 which is biased upwardly, away from the master table 40 (see FIG. 1) toward which the stylus tip 35 is directed, by means of a spring 94 acting against a disc-like stylus top 95. Positioned on either side of the stylus 34 are angle brackets 97 and 98 which support the bottom arm 99 of a U-shaped lever 100. The side arms of lever 100 are designated by numerals 101 and 102. The arm 100 is free to rotate in openings 103 and 104 in brackets 97 and 98, respectively. Extending from arm 100 is a protuberance 106 which engages and depresses the stylus downwardly when either or both arms 101 and 102 are pressed down by an operator.

The entire assembly 32, except for arms 101 and 102 and the stylus portion extending from the bottom side of arm 30, is coverable by a hinged cover 108. in operation the stylus is biased away from the master copy table 40 to insure that tip 35 clears the master 36. However, it is manually biasable toward the master to engage the master pattern by pressing either or both of the exposed lever side arms. Once the stylus tip 35 engages the pattern it is made to follow it by moving the arm 30 in the XY plane. This motion is provided by a manual force applied to arm 30. Preferably, a pair of handles 110 and 111 extend from the arm 30. Each of these handles is gripped by four fingers of the operator's hand while the thumb is used to depress one of the exposed lever side arms, as shown by the dashed lines. For smooth operation two-handed handling is preferred. However, it should be appreciated that an operator can handle the machine with either hand, since only one hand is sufficient to bias the stylus tip into the pattern and to apply forces to cause the arm 30 to move with the stylus tip following the outlined pattern.

While one hand is sufficient to move the work table with the workpiece thereon in a pattern corresponding to the master pattern, one foot is needed to depress the pedal 68 in order to lower the cutting tool into the moving workpiece. The use of a flexible hydraulic line 66, facilitates the positioning of the pedal 68 adjacent either of the operator's feet for operating comfort.

As seen from FIG. 6 to which reference is now made, the carved on engraved pattern on the workpiece is a reversed mirror image of the master pattern, since the motion of the table along either the X OR Y axis in one direction results in a cut in the same axis but in the opposite direction. In order to simplify master and workpiece set-up and the time required for this phase of the operation, the machine is designed so that when the stylus 34 is aligned with the center of the master copy table 40 the center of the work table 25 is exactly aligned with the cutting tool's axis of rotation. Thus, the setting up of the master or masters on the master table 40 and the workpiece 60 on the work table 25 can be referenced with respect to the tables' centers.

Figure 7:
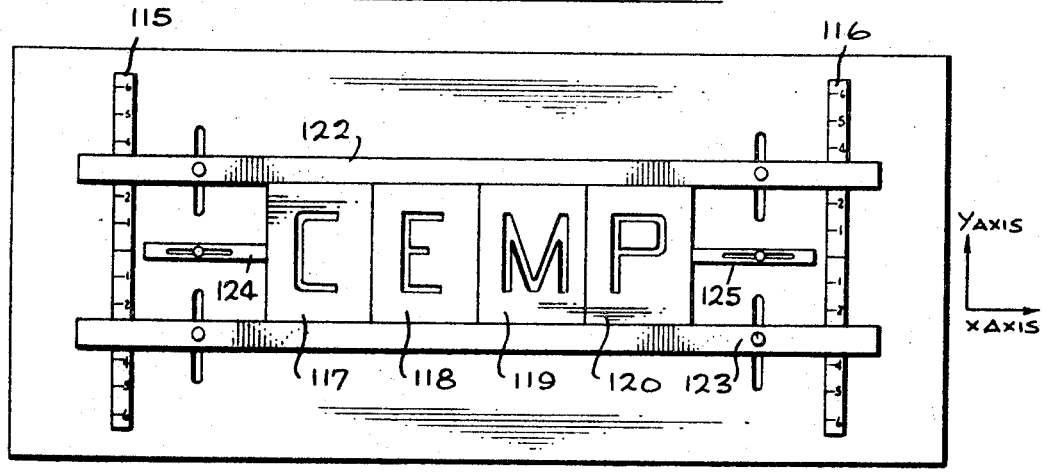
FIG. 7 is a top view of one embodiment of a master copy table.

The latter aspect of the invention may further be explained in conjunction with FIG. 7 which is a top view of one embodiment of the master copy table 40. It includes a pair of two-way scales 115 and 116, aligned along the Y axis, with the scales' 0 points aligned along the table's center line along the X axis. A plurality of masters designated 117–120 are shown defining the letters C, E, M and P respectively. A pair of hold-down bars 122 and 123 which extend along the X axis and selectively positionable along the Y axis are used to clamp and hold down the masters at a selected position along the Y axis. After selecting the position of the masters along the X axis, they are prevented from changing position by end brackets 124 and 125. The workpiece 60 is clamped and held on work table 25 by a similar arrangement, with respect to the table's center defined by its center lines along the X and Y axes.

The foregoing described novel machine may be summarized as comprising an arrangement for moving a workpiece on a work table in a horizontal (XY) plane. The workpiece is moved in a pattern corresponding to a master pattern, followed by a manually biased stylus which is coupled to the work table via an arm. The stylus which is spring biased so that its tip clears a master on a master table, except when a manual force, such as that provided by depressing an appropriate stylus lever, is applied to overcome the spring bias and urge the stylus tip to engage the master pattern. The movement of the work table as well as the activation of the stylus is achievable by the application of forces with either or both hands of the operator.

The actual carving or engraving of the workpiece is performed by a cutting tool, driven by a motor, which is supported by a novel motor assembly, with very accurate depth of cut control. The cutting tool is lowered into the moving workpiece by means of a pedal-activated hydraulic system, the pedal being operable by either foot of the operator.

Such an arrangement is unlike any known comparable machine. Typically in the prior art the workpiece is fixedly clamped and is not moved during carving or engraving. Rather, it is the motor unit which is moved. This results in excessive vibration which can only be eliminated by increased machine complexity and cost. However, such disadvantages are eliminated in the present invention in which the motor is locked in position, except for motion in a vertical Z axis. Also in the prior art, dexterity of both operator hands is required. One hand is used to follow the master pattern, while the other hand is used to press the motor toward the workpiece. The novel machine of the present invention however, is reliably operable with one hand and one foot, thus enabling persons with limited use of one arm to operate the machine. In addition, the machine of the present invention includes the novel motor assembly with the two elevation plates and the two motor plates which enable the operator to precisely select the depth of cut by following a simple, straight forward procedure. Also, the novel motor assembly adjustment enables the use of different length cutting tools and facilitates the accurate depth of cut into workpieces of various thicknesses.

Another very important advantage of the machine of the present invention is the independent downward motions of the stylus and the cutting tool. Thus, the stylus engages the pattern before cutting takes place. This enables the operator to view the expected cut area on the workpiece before actual cutting. Also it should be stressed that in the present invention the machine's dimensions in the X axis do not limit the length of material that can be carved by repeated settings.

Herebefore it has been assumed that the cutting tool's axis of rotation is in a vertical Z direction which is perpendicular to the XY plane. This is achieved by mounting plate 53 to elevation plate 52 so that the former is in a horizontal plane. In such an arrangement the cut width is always the same, being dependent on the diameter of the cutting tool. Although such an arrangement facilitates the carving or engraving of most conventional wood or plastic signs, the invention need not be limited thereto. For example, the motor may be mounted so that its axis of rotation forms an angle other than 90° with respect to the XY plane. In such an arrangement the width of the cut, produced at the top surface of the workpiece, would be a function of the cutting tool diameter, the tilt angle of the cutting tool with respect to the XY plane, the depth of cut and the direction of the cut.

Figure 8:
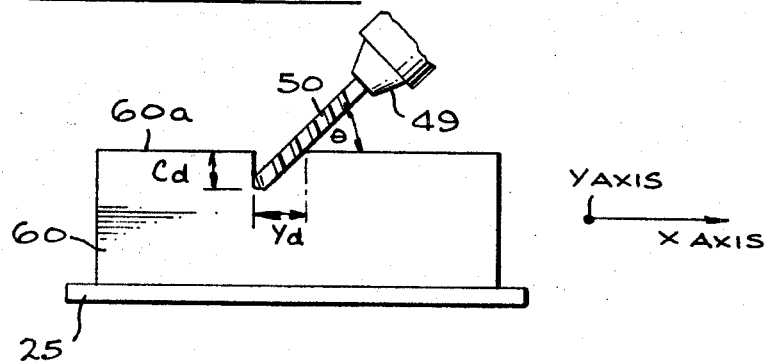
FIGS. 8 and 9 are figures useful in explaining another embodiment of the invention.

This aspect may best be explained in connection with FIG. 8 which is a cross-sectional view of workpiece 60 with cutting tool 50 at a cutting depth $C_d$ and at a tilt angle $\theta$ which is other than 90°. It should be apparent that the width of a cut at the top surface 60a of workpiece 60 along the X axis would correspond only to the diameter of the cutting tool 50. However, the width of a similar cut along the Y axis would depend on $C_d$, the cutting tool diameter, and $\theta$.

Figure 9:
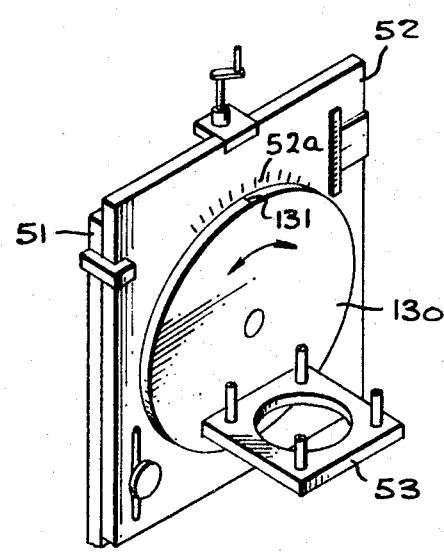

With $C_d$ and cutting tool diameter constant, the cut width would be indirectly proportional to $\theta$. Such cut-width variations is generally desirable for sign carving with script letters, or for various plaque carving applications. The angle $\theta$ may be easily controlled by fixedly mounting the plate 53 to a plate 130 (FIG. 9) which is selectively rotatable with respect to elevation plate 52 in the vertical plane about an axis of rotation in the Y axis. A scale 52a on plate 52 and a pointer 131 on the side of plate 130 can be used to select the angle $\theta$. Means may be provided to clamp plate 130 to plate 52 after the appropriate angle selection.

In another embodiment of the present invention the frame 10 may support by means of one or more arms 42 a plurality of motor assemblies 45, each with its separate motor 46 and depth control. With such an arrangement several identical patterns may be carved simultaneously on one or more workpieces from a single master setting. A manifold unit may be employed to select which of the motor assemblies are subjected to the hydraulic force which is applied when pedal 68 is depressed.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A machine for cutting a pattern in a workpiece, said machine comprising:
   a frame;
   a workpiece support structure including a work table on which a workpiece is supportable;
   first means for movably supporting said structure on said frame with said work table and the workpiece supported thereon being movable in a fixed preselected plane;
   a power unit including a member adapted to receive a cutting tool;
   second means including support means coupled to said frame for supporting said power unit above said work table and reciprocating said power unit relative to said work table, said second means further including bias means for biasing said power unit upwardly away from said work table, and means for controlling the maximum height of said power unit above said work table when said power unit is biased upwardly by said bias means;
   third means including first manually actuatable means for applying a downward force to said power unit to urge a cutting tool into engagement with said workpiece to a selected depth therein;
   a master table for supporting a pattern defining master; and
   fourth means including an arm projecting from said workpiece support structure to an end remote from said structure and overlying said master table, and second manually actuatable means disposed at said end for moving said work table and the workpiece thereon in said preselected plane in a selected pattern, said second manually actuatable means including a stylus with a tip extending toward said master and mounted for reciprocating movement relative to said arm, means for biasing said stylus tip upwardly away from said master, and at least one lever having at least one handle extending therefrom and engageable with said stylus and which when manually depressed urges said stylus tip downwardly relative to said arm to engage said master with said tip following the pattern defined therein by the application of manual force to said arm in a plane parallel to said fixed plane, whereby said pattern is cut by applying a downward force to said first actuatable means and to said second actuatable means and moving said work table and the workpiece thereon in said preselected plane.

2. A machine for cutting a pattern in a workpiece, comprising:
   a frame;
   a workpiece supporting structure including a work table on which a workpiece is supportable;
   first means for movably supporting said structure on said frame, with said work table and the workpiece supported thereon being movable in a fixed preselected plane;
   a power unit including a chuck-like member adapted to receive a cutting tool for rotation about a fixed axis of rotation defined by said power unit;

second means including support means coupled to said frame for supporting said power unit above said work table, said second means further including bias means for biasing said power unit upwardly away from said work table, and means for controlling the maximum height of said power unit above said work table when said power unit is biased upwardly by said bias means, a first power unit mounting plate defining an opening for guiding said power unit toward and away from said work table, and a second power unit mounting plate fixedly coupled to said power unit, said bias means being coupled to said first plate and extending through said second plate and including spring means between said plates for biasing said second plate away from said first plate, whereby said power unit coupled to said second plate is biased away from said work table;

third means including first manually actuatable means for applying a downward force to said power unit to urge a rotatable cutting tool in said chuck-like member into engagement with said workpiece to a selected depth thereinto;

fourth means including second manually actuatable means for moving said work table and the workpiece thereon in said selected plane in a selected pattern, whereby said pattern is cut in said moving workpiece by the cutting tool engaged therein.

3. The arrangement as recited in claim 1 wherein said stylus comprises a cylindrical member extending through said arm with the end extending below said arm terminating in a tip and the end above said arm terminating in a flange, and said means for biasing said stylus comprising a coil spring surrounding said stylus portion extending above said arm, for applying an upward bias force to said stylus flange.

4. The arrangement as recited in claim 2 wherein said second means include a first elevation plate coupled to said frame through the support means of said second means, and disposed in a plane perpendicular to said selected plane, a second elevation plate associated with said first elevation plate and controllably movable with respect thereto only in a direction perpendicular to said selected plane, and means for connecting said first power unit mounting plate to said second elevation plate with the axis of rotation of said power unit at a selected angle with respect to said selected plane.

5. The arrangement as recited in claim 4 wherein said machine further includes a master table for supporting a pattern-defining master, said fourth means including an arm extending from said workpiece support structure to an end remote from said structure, with said second manually actuatable means disposed at said end, said second manually actuatable means comprising a stylus with a tip extending toward said master, means for biasing said stylus tup upwardly away from said master and a manually actuatable member for urging said stylus tip downwardly to engage said master, with said tip following the pattern defined therein by the application of manual forces to said arm in a plane parallel to said fixed plane.

6. The arrangement as recited in claim 5 wherein said manually actuatable member includes at least one lever arm which when depressed downwardly urges said stylus tip toward said master and said arm includes at least one handle extending therefrom and located near said lever arm whereby depressing said lever arm and applying manual forces to said arm is facilitated by one operator hand.

7. The arrangement as recited in claim 6 wherein said stylus comprises a cylindrical member extending through said arm with the end extending below said arm terminating in a tip and the end above said arm terminating in a flange, and said means for biasing said stylus comprising a coil spring surrounding said stylus portion extending above said arm, for applying an upward bias force to said stylus flange.

8. The arrangement as recited in claim 7 wherein said axis of rotation is perpendicular to said selected plane, and the center of said work table is aligned with said axis of rotation when the center of said master table is aligned with the longitudinal axis of said stylus.

* * * * *